United States Patent
Ikuta

(10) Patent No.: US 12,252,069 B2
(45) Date of Patent: Mar. 18, 2025

(54) LIGHT DISTRIBUTION CONTROL APPARATUS THAT IRRADIATES DIFFERENT REGIONS WITH A DIFFERENT ILLUMINANCES

(71) Applicant: TOYOTA JIDOSHA KABUSHIKI KAISHA, Toyota (JP)

(72) Inventor: Tetsuya Ikuta, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/533,845

(22) Filed: Dec. 8, 2023

(65) Prior Publication Data
US 2024/0246477 A1 Jul. 25, 2024

(30) Foreign Application Priority Data
Jan. 19, 2023 (JP) .................. 2023-006844

(51) Int. Cl.
*B60Q 1/14* (2006.01)
*F21S 41/657* (2018.01)

(52) U.S. Cl.
CPC ............ *B60Q 1/143* (2013.01); *F21S 41/657* (2018.01); *B60Q 2300/054* (2013.01); *B60Q 2300/42* (2013.01)

(58) Field of Classification Search
CPC . B60Q 1/143; B60Q 2300/41; B60Q 2300/42
See application file for complete search history.

(56) References Cited

U.S. PATENT DOCUMENTS

| | | | | |
|---|---|---|---|---|
| 5,837,994 A | * | 11/1998 | Stam | ...................... H04N 25/00 250/214 D |
| 7,703,955 B2 | * | 4/2010 | Watanabe | .............. B60Q 1/085 362/465 |
| 10,759,329 B2 | | 9/2020 | Morimura et al. | |
| 10,946,791 B2 | | 3/2021 | Morimura et al. | |
| 11,260,789 B2 | | 3/2022 | Morimura et al. | |
| 2012/0206043 A1 | | 8/2012 | Yamazaki et al. | |
| 2013/0049587 A1 | | 2/2013 | Nakadate | |
| 2016/0250964 A1 | | 9/2016 | Takagaki et al. | |
| 2020/0150702 A1 | | 5/2020 | Ueda | |

FOREIGN PATENT DOCUMENTS

| | | |
|---|---|---|
| JP | 2012-166633 A | 9/2012 |
| JP | 2016-027977 A | 2/2016 |
| JP | 2016-159709 A | 9/2016 |

* cited by examiner

*Primary Examiner* — Robert J May
(74) *Attorney, Agent, or Firm* — Sughrue Mion, PLLC

(57) ABSTRACT

A light distribution control apparatus includes an imaging device capable of capturing an image of a front vehicle existing in front of an own vehicle, a headlight capable of irradiating a front region of the own vehicle, and a control unit capable of executing light distribution control for controlling light distribution of the headlight so that a predetermined first region including the front vehicle and a predetermined second region other than the first region are irradiated with different illuminances based on the captured image obtained by capturing an image of the front region of the own vehicle. The control unit sets an illuminance irradiated in the first region to be less than an illuminance irradiated in the second region, and sets an area of the first region based on a position in a lateral direction of the front vehicle in the captured image.

5 Claims, 5 Drawing Sheets

LIGHT DISTRIBUTION CONTROL APPARATUS THAT IRRADIATES DIFFERENT REGIONS WITH A DIFFERENT ILLUMINANCES

BACKGROUND OF THE INVENTION

1. Field of the Invention

The present invention relates to a light distribution control apparatus capable of executing light distribution control for controlling light distribution of a headlight.

2. Description of the Related Art

Conventionally, a light distribution control apparatus is known which executes, when a vehicle is detected in front of an own vehicle by an imaging device, light distribution control for controlling light distribution of a headlight so that a predetermined first region including the vehicle in front (hereinafter, also referred to as "front vehicle") and a predetermined second region other than the first region are irradiated with different illuminances (see, for example, JP-A-2016-159709). The light distribution control apparatus sets an illuminance irradiated in the first region to be less than an illuminance irradiated in the second region. According to this light distribution control, it is possible to ensure visibility to a far distance without dazzling a passenger of the front vehicle, and thus, traveling safety at night is improved.

A conventional light distribution control apparatus (hereinafter, referred to as a "conventional apparatus") calculates a position (distance and azimuth) of the front vehicle based on a captured image (a captured image obtained by capturing an image in front of the own vehicle) acquired from the imaging device, and calculates an area of the first region based on the calculated position of the front vehicle. According to this configuration, there is a possibility that a position of the first region is shifted.

That is, the conventional apparatus calculates the distance from the own vehicle to the front vehicle based on a size of a light of the front vehicle in the captured image (in other words, the number of pixels of the light in the captured image). Here, depending on an imaging state, the light may be imaged larger than an actual image, or the light may be imaged in a deformed manner. In this case, since the conventional apparatus cannot appropriately calculate the distance from the own vehicle to the front vehicle, there is a possibility that an error occurs in the position of the front vehicle and the position of the first region is shifted. As a result, there arises a problem that the area of the first region is not appropriately set, such as when the front vehicle is irradiated or shielded or dimmed to a position significantly separated from the front vehicle.

In addition, the conventional apparatus identifies a type of the front vehicle (preceding vehicle or oncoming vehicle) by machine learning based on the captured image, and calculates the area of the first region based on the identified type of the front vehicle. According to this configuration, a size of the first region may change frequently. That is, the conventional apparatus determines the size of the first region according to the type of the front vehicle. Here, depending on image processing capability of the imaging device, the type of the front vehicle may be erroneously identified. When this phenomenon occurs frequently, the size of the first region changes frequently, and as a result, there arises a problem that the area of the first region is not appropriately set.

SUMMARY OF THE INVENTION

The present invention has been made to address the above-mentioned problems. That is, an object of the present invention is to provide a light distribution control apparatus capable of appropriately setting an area of a predetermined first region including a front vehicle.

A light distribution control apparatus according to the present invention includes an imaging device, a headlight, and a control unit. The imaging device is capable of capturing an image of a front vehicle existing in front of an own vehicle. The headlight is capable of irradiating a front region of the own vehicle. The control unit is capable of executing light distribution control for controlling light distribution of the headlight so that a predetermined first region including the front vehicle and a predetermined second region other than the first region are irradiated with different illuminances based on the captured image obtained by capturing an image of the front region of the own vehicle. The control unit is configured to set an illuminance to be irradiated in the first region to be less than an illuminance to be irradiated in the second region, and to set an area of the first region based on a position in a lateral direction of the front vehicle in the captured image.

A length in the lateral direction of the captured image (strictly, the effective area of the captured image) corresponds to an angle of view (horizontal angle of view) in the lateral direction of the imaging device. Therefore, by setting the area of the first region based on the position in the lateral direction of the front vehicle in the captured image, the position of the first region is prevented from being shifted or the size of the first region is prevented from being changed frequently, and thus it is possible to appropriately set the area of the first region.

In one aspect of the present invention, an angle in the lateral direction of a right end and a left end of the front vehicle with respect to a front-rear axis of the own vehicle is defined as a right vehicle angle and a left vehicle angle, respectively. In this case, the control unit is configured to calculate the right vehicle angle and the left vehicle angle based on positions in the lateral direction of the right end and the left end of the front vehicle in the captured image, respectively, and to calculate a difference between the right vehicle angle and the left vehicle angle as a vehicle width angle of the front vehicle. The control unit is configured to execute the light distribution control so that a right margin from the right end of the front vehicle to a right end of the first region increases as at least one of an absolute value of the right vehicle angle or the vehicle width angle increases, and to execute the light distribution control so that a left margin from the left end of the front vehicle to a left end of the first region increases as at least one of an absolute value of the left vehicle angle or the vehicle width angle increases.

According to this configuration, in a region necessary for driving operation, it is possible to ensure visibility to a far distance in a wider area in a left-right direction without dazzling a passenger of the front vehicle. In addition, in a region that has little influence on the driving operation, it is possible to reliably reduce a possibility of dazzling the passenger of the front vehicle. As a result, it is possible to more appropriately set the area of the first region.

In one aspect of the present invention, an angle in a vertical direction of an upper end and a lower end of the front vehicle with respect to the front-rear axis of the own vehicle is defined as an upper vehicle angle and a lower vehicle angle, respectively. In this case, the control unit is configured to calculate the upper vehicle angle and the lower vehicle angle based on positions in the vertical direction of the upper end and the lower end of the front vehicle in the captured image, respectively, and to calculate a difference between the upper vehicle angle and the lower vehicle angle as a vehicle height angle of the front vehicle. The control unit is configured to execute the light distribution control so that an upper margin from the upper end of the front vehicle to an upper end of the first region and a lower margin from the lower end of the front vehicle to a lower end of the first region increase as at least one of an absolute value of a center vehicle angle, which is a center angle between the right vehicle angle and the left vehicle angle, or the vehicle height angle increases.

According to this configuration, in the region necessary for the driving operation, it is possible to ensure visibility to a far distance in a wider area in an up-down direction without dazzling the passenger of the front vehicle. In addition, in a region that has little influence on the driving operation, it is possible to reliably reduce the possibility of dazzling the passenger of the front vehicle. As a result, it is possible to more appropriately set the area of the first region.

In one aspect of the present invention, an angle in the lateral direction on a right side with respect to the front-rear axis is defined as a positive value, and an angle in the lateral direction on a left side with respect to the front-rear axis is defined as a negative value. In this case, when an oncoming lane on which an oncoming vehicle travels is located on the right side with respect to a traveling lane on which the own vehicle travels, an increase rate of the right margin associated with an increase in the right vehicle angle having a positive value is greater than an increase rate of the right margin associated with a decrease in the right vehicle angle having a negative value, and an increase rate of the left margin associated with a decrease in the left vehicle angle having a negative value is greater than an increase rate of the left margin associated with an increase in the left vehicle angle having a positive value. Further, when the oncoming lane is located on the left side with respect to the traveling lane, an increase rate of the right margin associated with a decrease in the right vehicle angle having a negative value is greater than an increase rate of the right margin associated with an increase in the right vehicle angle having a positive value, and an increase rate of the left margin associated with an increase in the left vehicle angle having a positive value is greater than an increase rate of the left margin associated with a decrease in the left vehicle angle having a negative value.

According to this configuration, it is possible to more reliably reduce the possibility of dazzling the passenger of the front vehicle in a region that has little influence on the driving operation.

In one aspect of the present invention, an angle in the lateral direction of a right end and a left end of the front vehicle with respect to a front-rear axis of the own vehicle is defined as a right vehicle angle and a left vehicle angle, respectively, and an angle in a vertical direction of an upper end and a lower end of the front vehicle with respect to the front-rear axis is defined as an upper vehicle angle and a lower vehicle angle, respectively. In this case, the control unit is configured to calculate the right vehicle angle and the left vehicle angle based on positions in the lateral direction of the right end and the left end of the front vehicle in the captured image, respectively, calculate the upper vehicle angle and the lower vehicle angle based on positions in the vertical direction of the upper end and the lower end of the front vehicle in the captured image, respectively, and calculate a difference between the upper vehicle angle and the lower vehicle angle as a vehicle height angle of the front vehicle. The control unit is configured to execute the light distribution control so that an upper margin from the upper end of the front vehicle to an upper end of the first region and a lower margin from the lower end of the front vehicle to a lower end of the first region increase as at least one of an absolute value of a center vehicle angle, which is a center angle between the left vehicle angle and the right vehicle angle, or the vehicle height angle increases.

According to this configuration, in the region necessary for the driving operation, it is possible to ensure visibility to a far distance in a wider area in the up-down direction without dazzling the passenger of the front vehicle. In addition, it is possible to reliably reduce the possibility of dazzling the passenger of the front vehicle in a region that has little influence on the driving operation. As a result, it is possible to more appropriately set the area of the first region.

In the above description, in order to facilitate understanding of the present invention, reference numerals used in the embodiments are attached to constituent elements of the invention corresponding to the embodiments with parentheses, but each constituent element of the invention is not limited to the embodiment defined by the reference numerals.

DESCRIPTION OF THE EMBODIMENT

Figure 1:
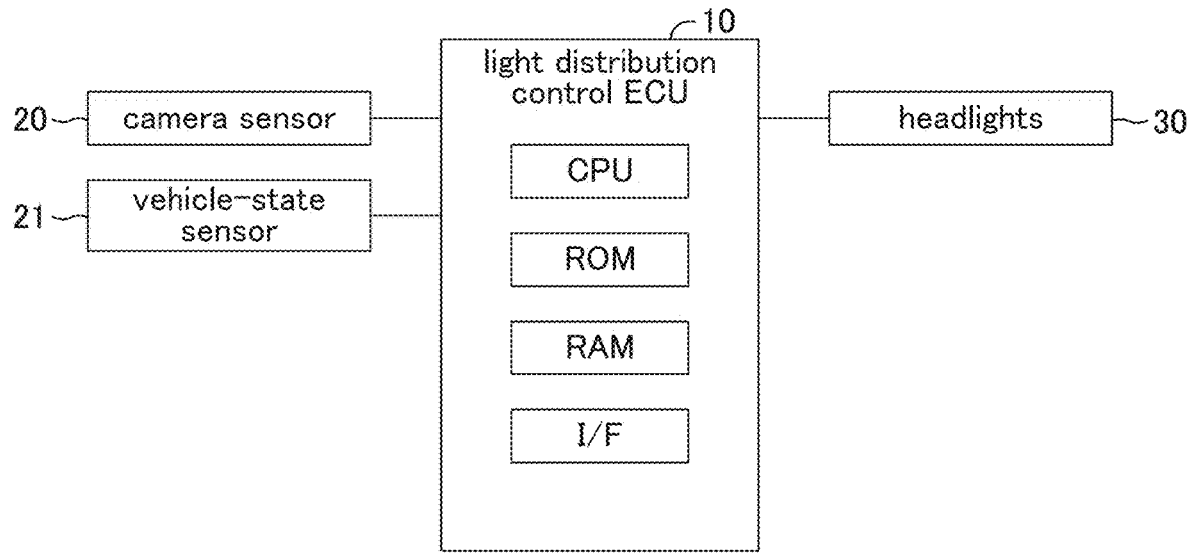
FIG. 1 is a schematic configuration diagram of a light distribution control apparatus according to an embodiment of the present invention.

Hereinafter, a light distribution control apparatus according to an embodiment of the present invention (hereinafter, also referred to as "the present embodiment apparatus") will be described with reference to the drawings. The present embodiment apparatus is mounted on a vehicle. As illustrated in FIG. 1, the present embodiment apparatus includes a light distribution control ECU10, a camera sensor 20, a vehicle-state sensor 21, and headlights 30. The camera sensor 20, the vehicle-state sensor 21, and the headlights 30 are connected to the light distribution control ECU10. The light distribution control ECU10 includes a microcomputer as a main part. The microcomputer includes a CPU, ROM, RAM, an interface (I/F), and the like, and CPU implements various functions by executing instructions (programs, routines) stored in the ROM. Hereinafter, a vehicle equipped with the present embodiment apparatus will be referred to as an "own vehicle". Further, the light distribution control ECU10 is also simply referred to as "ECU10". In the present embodiment, an oncoming lane on which an oncoming vehicle travels is located on a right side with respect to a traveling lane on which the own vehicle travels.

The camera sensor 20 (imaging device) is installed on a rear surface of an inner mirror (rear view mirror) of the own vehicle. When the own vehicle is viewed in a plan view, an optical axis of the camera sensor 20 coincides with a front-rear axis of the own vehicle. Here, the front-rear axis is an axis that passes through a center in a vehicle width direction of the own vehicle and is parallel to a ground plane (tread) of the own vehicle. The camera sensor 20 captures an image of a front region of the own vehicle to generate a captured image (image data). Each time a predetermined period of time elapses, the camera sensor 20 transmits information including the generated captured image to the ECU10 as image information.

The vehicle-state sensor 21 is a plurality of types of sensors that detect a vehicle state. The vehicle-state sensor 21 includes a vehicle speed sensor, an acceleration sensor, a yaw rate sensor, and a steering angle sensor. The vehicle-state sensor 21 transmits a detection signal to the ECU10 every time the predetermined period of time elapses. ECU10 calculates a speed (vehicle speed), an acceleration, a yaw rate, and a steering angle of the own vehicle based on the detection signal. ECU10 acquires information including the vehicle speed, the acceleration, the yaw rate, and the steering angle obtained by the calculation as vehicle-state information.

The headlights 30 includes a left headlight provided at a left front end portion of the own vehicle and a right headlight provided at a right front end portion of the own vehicle. Each of the left headlight and the right headlight is a traveling headlight that functions as a high beam. In the present embodiment, an illustration of a passing headlight that functions as a low beam is omitted. The headlights 30 are lights, each using an LED matrix as a light source. The LED matrix of the left headlight includes a plurality of LEDs (e.g., 20000). When the own vehicle is viewed from the front, these LEDs are two-dimensionally arranged at predetermined intervals in a lateral direction and a vertical direction. A structure of the right headlight is symmetrical to a structure of the left headlight with respect to the front-rear axis of the own vehicle. The ECU10 independently controls turning on or off of the LEDs of the left and right headlights for each LED. The ECU 10 independently controls current supplied to the LEDs of the left and right headlights for each LED. When each of the LEDs is controlled to be turned on by the ECU 10, the corresponding LED emits light to irradiate the front region of the own vehicle.

The ECU 10 detects a dividing line extending in front of the own vehicle based on the image information. The ECU 10 calculates a shape of a lane based on the detected dividing lines. Here, a lane is a region between two adjacent dividing lines.

In addition, the ECU 10 detects a light source based on the image information. The light source includes surrounding light and other vehicle light. The surrounding light is light of streetlights, buildings, and the like. The other vehicle light is light of the front vehicle, and is typically a headlight(s) of an oncoming vehicle and a tail lamp(s) of a preceding vehicle. Note that the preceding vehicle includes not only the front vehicle on the traveling lane but also the front vehicle traveling in the same direction as the own vehicle on an adjacent lane. The ECU 10 identifies a type of the light source detected (surrounding light or other vehicle light) in a well-known manner. For example, when a displacement amount of a light source in a predetermined time interval is less than a predetermined displacement amount threshold, the ECU 10 identifies that the light source is the surrounding light and when a displacement amount of a light source is equal to or greater than the displacement amount threshold, the ECU 10 identifies that the light source is the other vehicle light.

In addition, the ECU 10 calculates an environmental illuminance, which is an illuminance around the own vehicle, in a well-known manner based on the image information. For example, the ECU 10 calculates the environmental illuminance by converting a brightness of each pixel constituting the captured image into an illuminance.

The ECU 10 is capable of executing adaptive high-beam control. Hereinafter, the control is also referred to as "AH control". The AH control is control for controlling light distribution (high-beam light distribution) of the headlights 30 so that a predetermined first region including the front vehicle and a predetermined second region other than the first region are irradiated with different illuminances. The illuminance to be irradiated in the first region is set to be less than the illuminance to be irradiated in the second region. That is, the first region may be referred to as a "dimming region" or a "shading region." In the present embodiment, the ECU 10 controls the light distribution of the headlights 30 so that the first region is not irradiated. Therefore, the first region is a shading region. The AH control is control executed by a light distribution control apparatus employing adaptive high-beam system. The adaptive high-beam system is synonymous with "adaptive driving beam".

The ECU 10 starts the AH control when a predetermined start condition is satisfied. The start condition is satisfied when all of the following conditions 1 to 4 are satisfied.
  (Condition 1) The vehicle speed is equal to or higher than a predetermined first vehicle speed threshold (for example, 15 km/h).
  (Condition 2) Other vehicle light is detected.
  (Condition 3) There are a few surrounding lights.
  (Condition 4) The environmental illuminance is equal to or less than a predetermined first environmental illuminance threshold.

The Condition 3 is satisfied, for example, when the number of the surrounding lights is equal to or less than a predetermined number threshold and no surrounding light with light intensity thereof exceeding a predetermined intensity threshold is detected.

On the other hand, the ECU 10 terminates the AH control when a predetermined end condition is satisfied. The end condition is satisfied when at least one of the following conditions 5 to 7 is satisfied.
  (Condition 5) The vehicle speed is equal to or less than a predetermined second vehicle speed threshold (for example, 12 km/h) that is less than the first vehicle speed threshold.
  (Condition 6) There are many surrounding lights.
  (Condition 7) The environmental illuminance is equal to or higher than a predetermined second environmental illuminance threshold that is larger than the first environmental illuminance threshold.

The condition 6 is satisfied, for example, when the number of the surrounding lights exceeds the number threshold or when one or more surrounding lights with light intensity thereof exceeding the intensity threshold are detected.

However, the conditions under which the start condition and the end condition are satisfied are not limited to the above.

Figure 2:
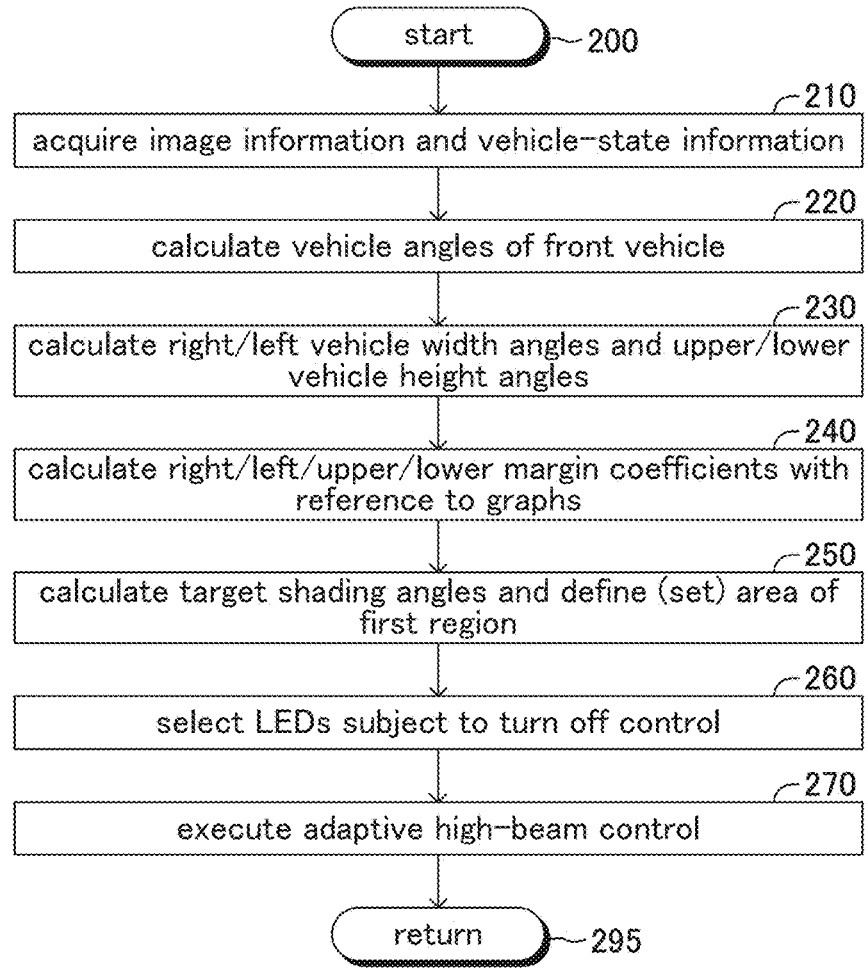
FIG. 2 is a flow chart showing a routine executed by CPU of light distribution control ECU.

During a period from when the start condition is satisfied until the end condition is satisfied, CPU of the ECU 10 repeatedly executes a routine shown by a flowchart of FIG. 2. When a predetermined timing arrives, the CPU proceeds from step 200 to step 210 to acquire the image information and the vehicle-state information. Subsequently, the CPU proceeds to step 220 to calculate vehicle angles θ of the front vehicle based on the image information. The vehicle angles θ include a right vehicle angle θr, a left vehicle angle θle, a center vehicle angle θm, an upper vehicle angle θu, and a lower vehicle angle θl. The right vehicle angle θr is an angle in the lateral direction (lateral angle) of a right end of the front vehicle with respect to the front-rear axis of the own vehicle. The left vehicle angle θle is a lateral angle of a left end of the front vehicle with respect to the front-rear axis. The center vehicle angle θm is a lateral angle of a center of the front vehicle in the lateral direction with respect to the front-rear axis. The upper vehicle angle θu is an angle in the vertical direction (vertical angle) of an upper end of the front vehicle with respect to the front-rear axis. The lower vehicle angle θl is a vertical angle of a lower end of the front vehicle with respect to the front-rear axis.

The CPU estimates an outer shape F of the front vehicle based on the light source of the front vehicle detected from the captured image I. The outer shape F is rectangular, and consists of a set of edges extending in the lateral direction and a set of edges extending in the vertical direction. Hereinafter, a position in the lateral direction of an arbitrary point P in the captured image I is referred to as a "lateral position". In addition, a position in the vertical direction of the point P is referred to as a "vertical position". The CPU calculates a lateral position Pr of a right end of the outer shape F, a lateral position Ple of a left end of the outer shape F, a lateral position Pm of a center M of the outer shape F, a vertical position Pu of an upper end of the outer shape F, and a vertical position Pl of a lower end of the outer shape F. The lateral positions Pr, Ple and Pm may be calculated as lengths (i.e., the number of pixels) in the lateral direction from an FOE (Focus Of Expansion) of the captured image I, respectively. The vertical positions Pu and Pl may be calculated as lengths (i.e., the number of pixels) in the vertical direction from the FOE, respectively. The CPU calculates the right vehicle angle θr, the left vehicle angle θle, the center vehicle angle θm, the upper vehicle angle θu, and the lower vehicle angle θl by converting the lateral position Pr, the lateral position Ple, the lateral position Pm, the vertical position Pu, and the vertical position Pl into respective angles in a manner described later.

Figure 3:
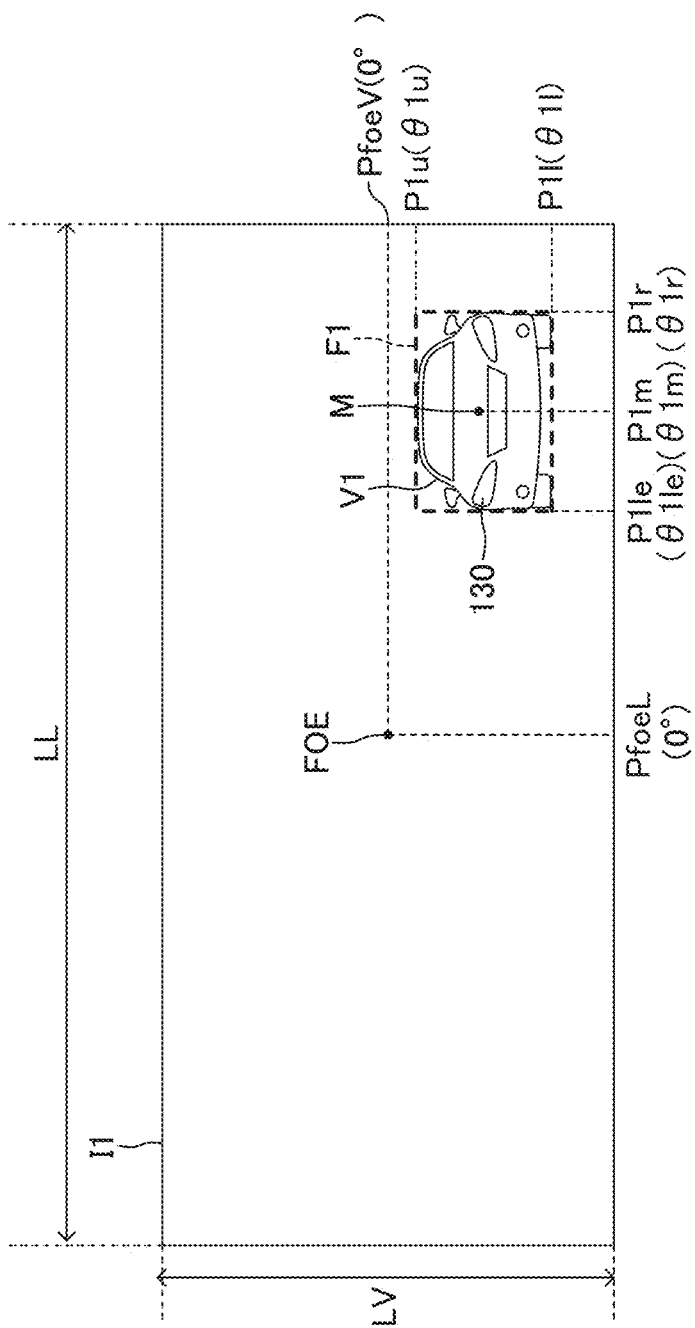
FIG. 3 is a diagram for describing a calculation method of right/left/center/upper/lower vehicle angles of an oncoming vehicle in a captured image.

A specific description will be given with reference to FIG. 3. FIG. 3 is a diagram illustrating a captured image I1 obtained when the headlights 130, each of which being a light source of an oncoming vehicle V1, is captured by the camera sensor 20. In FIG. 3, for convenience of description, a vehicle body of the oncoming vehicle V1 is also illustrated, but what is actually imaged is only the headlights 130. Note that illustration of dividing lines is omitted. The CPU estimates an outer shape F1 of the oncoming vehicle V1 based on the detected headlights 130. Then, the CPU calculates a lateral position P1r of a right end of the outer shape F1, a lateral position P1le of a left end of the outer shape F1, a lateral position P1m of a center M of the outer shape F1, a vertical position P1u of an upper end of the outer shape F1, and a vertical position P1l of a lower end of the outer shape F1.

A length LL in the lateral direction of the captured image I1 corresponds to a horizontal angle of view θL of the camera sensor 20. Further, as described above, the optical axis of the camera sensor 20 passes through the center of the own vehicle in the vehicle width direction (lateral direction). That is, an angle corresponding to a lateral position PfoeL of the FOE (a lateral angle with respect to the front-rear axis) is 0°. Therefore, the right vehicle angle θ1r of the oncoming vehicle V1 can be calculated by proportionally distributing the "horizontal angle of view θL of the camera sensor 20" by a "ratio of the lateral position P1r to the lateral length LL of the captured image I1" (θ1r=θL×P1r/LL). The left vehicle angle θ1le of the oncoming vehicle V1 can be calculated by proportionally distributing the "horizontal angle of view θL" by a "ratio of the lateral position P1le to the lateral length LL" (θ1le=θL×P1le/LL). The central vehicle angle θ1m of the oncoming vehicle V1 can be calculated by proportionally distributing the "horizontal angle of view θL" by a "ratio of the lateral position P1m to the lateral length LL" (θ1m=θL×P1m/LL). Here, θ1m=(θ1r+θ1le)/2.

On the other hand, a length LV in the vertical direction of the captured image I1 corresponds to a vertical angle of view θV of the camera sensor 20. In the present embodiment, the optical axis of the camera sensor 20 is oriented in such a direction that the FOE is located at a center in the vertical direction of the captured image I1. Therefore, an angle corresponding to a vertical position PfoeV of the FOE (a vertical angle with respect to the front-rear axis) is 0°. Therefore, the upper vehicle angle θ1u of the oncoming vehicle V1 can be calculated by proportionally distributing "the vertical angle of view θV of the camera sensor 20" by a "ratio of the vertical position P1u to the vertical length LV of the captured image I1" (θ1u=θV×P1u/LV). The lower vehicle angle θ1l of the oncoming vehicle V1 can be calculated by proportionally distributing the "vertical angle of view θV" by a "ratio of the vertical position P1l to the vertical length LV" (θ1l=θV×P1l/LV).

In the present embodiment, an angle in the lateral direction on a right side with respect to the front-rear axis is defined as a positive value, and an angle in the lateral direction on a left side with respect to the front-rear axis is defined as a negative value. That is, in the captured image I, the right vehicle angle θr or the left vehicle angle θle of when the lateral position Pr or the lateral position Ple of the front vehicle is located on the right side with respect to the lateral position PfoeL is a positive value. In the captured image I, the right vehicle angle θr or the left vehicle angle θle of when the lateral position Pr or the lateral position Ple of the front vehicle is located on the left side with respect to the lateral position PfoeL is a negative value. In addition, in the present embodiment, in the captured image I, the upper vehicle angle θu or the lower vehicle angle θl of when the vertical position Pu or the vertical position Pl of the front vehicle is positioned on an upper side with respect to the vertical position PfoeV is defined as a positive value. Further, in the captured image I, the upper vehicle angle θu or the lower vehicle angle θl of when the vertical position Pu or the vertical position Pl of the front vehicle is positioned on a lower side with respect to the vertical position PfoeV is defined as a negative value.

When the vehicle angle θ of the front vehicle is calculated, the CPU advances the process to step 230, and calculates a right vehicle width angle Δθr and a left vehicle width angle Δθle from a vehicle width angle ΔθL of the front vehicle, and calculates an upper vehicle height angle Δθu and a lower vehicle height angle Δθl from a vehicle height angle ΔθV of the front vehicle. The vehicle width angle ΔθL is a difference between the right vehicle angle θr and the left vehicle angle θle. The vehicle width angle ΔθL corresponds to a lateral length of the front vehicle (strictly, a lateral length of the outer shape F) in the captured image I. The CPU calculates a half of the vehicle width angle ΔθL as the right vehicle width angle Δθr and the left vehicle width angle Δθle, respectively. That is, Δθr=Δθle=ΔθL/2=|θr−θle|/2. The right vehicle width angle Δθr corresponds to a lateral length from the center M of the front vehicle to the right end thereof. The left vehicle width angle Δθle corresponds to a lateral length from the center M of the front vehicle to the left end thereof. On the other hand, the vehicle height angle ΔθV is a difference between the upper vehicle angle θu and the lower vehicle angle θl. The vehicle height angle ΔθV corresponds to a vertical length of the front vehicle in the captured image I. The CPU calculates a half of the vehicle height angle ΔθV as the upper vehicle height angle Δθu and the lower vehicle height angle Δθl, respectively. That is, Δθu=Δθl=ΔθV/2=|θu−θl|/2. The upper vehicle height angle Δθu corresponds to a vertical length from the center M of the front vehicle to the upper end thereof. The lower vehicle height angle Δθl corresponds to a vertical length from the center M of the front vehicle to the lower end thereof. In FIG. 3, the right vehicle width angle Δθ1r and the left vehicle width angle Δθ1le of the oncoming vehicle V1 are both |θ1r−θ1le|/2, and the upper vehicle height angle Δθ1u and the lower vehicle height angle Δθ1l of the oncoming vehicle V1 are both |θ1u−θ1ll|/2.

After calculating the right/left vehicle width angles Δθr/Δθle and the upper/lower vehicle height angles Δθu/Δθl of the front vehicle, the CPU proceeds to step 240 to determine margin coefficients C for defining an area of the first region R1. The margin coefficients C includes a right margin coefficient Cr, a left margin coefficient Cle, an upper margin coefficient Cu, and a lower margin coefficient Cl.

Figure 4:
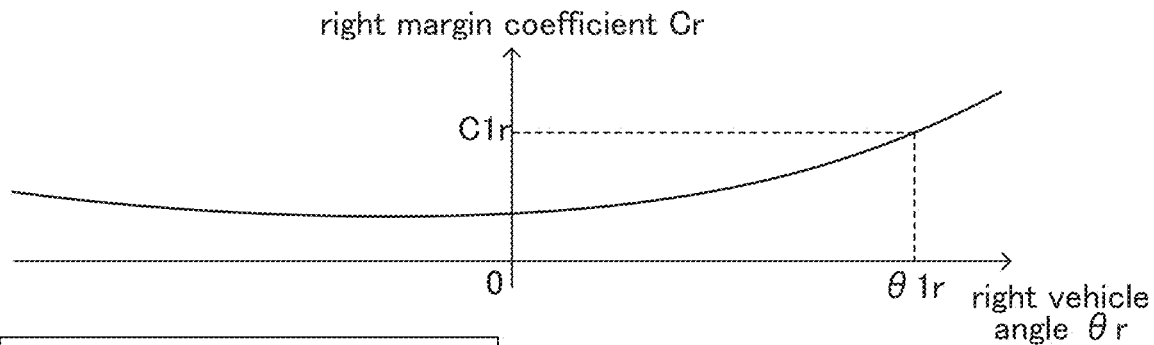
FIG. 4 is a diagram showing graphs for right/left/up/down margin coefficients.
Figure 4:
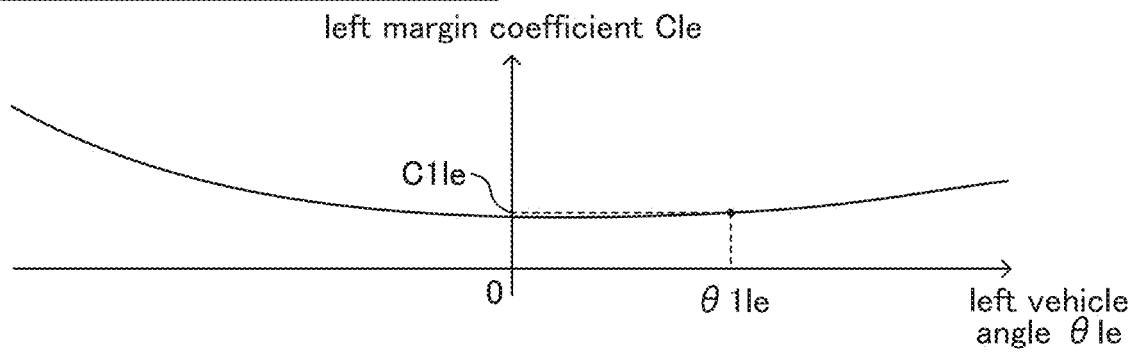
Figure 4:
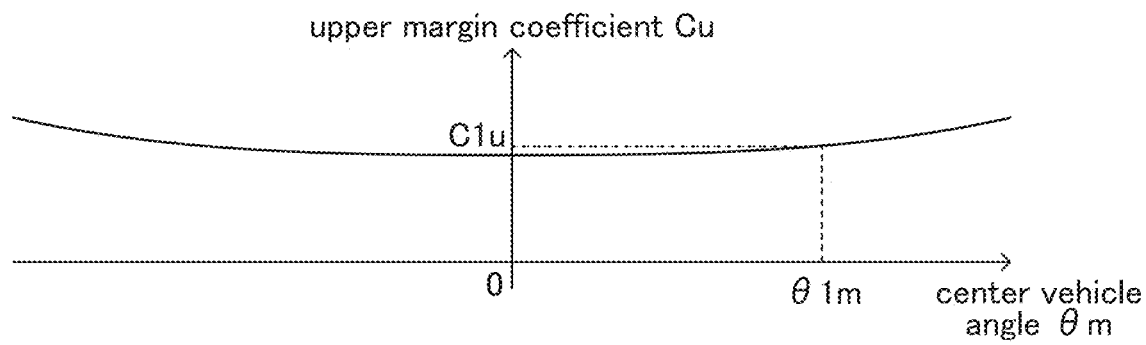
Figure 4:
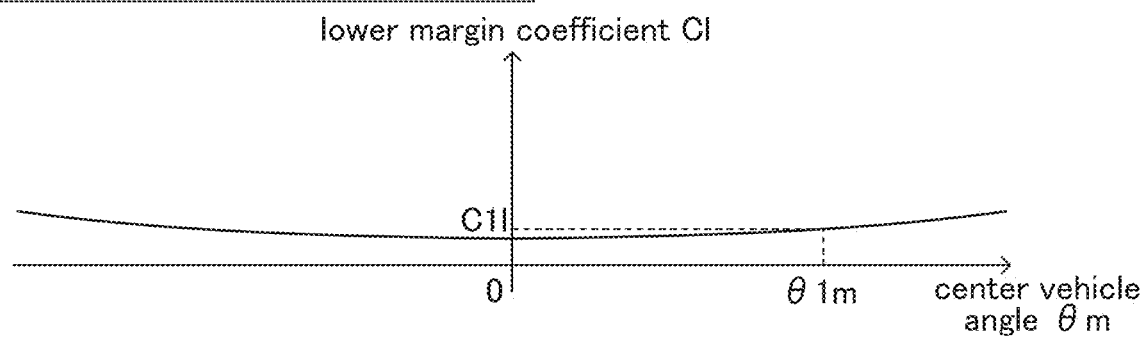

FIG. 4 shows graphs, each of which defining a relationship between the vehicle angle θ and the margin coefficient C. The right margin coefficient Cr is determined by reading a margin coefficient C corresponding to the right vehicle angle θr by referring to a right margin coefficient graph Gr. According to the graph Gr, the right margin coefficient Cr increases as an absolute value of the right vehicle angle θr increases. The left margin coefficient Cle is determined by reading a margin coefficient C corresponding to the left vehicle angle θle by referring to a left margin coefficient graph Gle. According to the graph Gle, the left margin coefficient Cle increases as an absolute value of the left vehicle angle θle increases. On the other hand, the upper margin coefficient Cu and the lower margin coefficient Cl are determined by reading margin coefficients C corresponding to the center vehicle angle θm by referring to an upper margin coefficient graph Gu and a lower margin coefficient graph Gl, respectively. The graph Gu and the graph Gl are both symmetrical with respect to the vertical axis, and the upper margin coefficient Cu and the lower margin coefficient Cl increase slightly as an absolute value of the center vehicle angle θm increases. The smallest values of these margin coefficients Cr, Cle, Cu and Cl are all greater than 1.

After determining the margin coefficients C, the CPU proceeds to step 250 to calculate target shading angles Δθi t corresponding to the area of the first region R1, and define (set) the area of the first region R1. The target shading angles Δθi t include a right target shading angle Δθrt, a left target shading angle Δθlet, an upper target shading angle Δθut, and a lower target shading angle Δθlt. The right target shading angle Δθrt corresponds to a lateral length from the center M of the front vehicle to a right end of the first region R1, and can be calculated by multiplying the right vehicle width angle Δθr by the right margin coefficient Cr. The left target shading angle Δθlet corresponds to a lateral length from the center M to a left end of the first region R1, and can be calculated by multiplying the left vehicle width angle Δθle by the left margin coefficient Cle. The upper target shading angle Δθut corresponds to a vertical length from the center M to an upper end of the first region R1, and can be calculated by multiplying the upper vehicle height angle Δθu by the upper margin coefficient Cu. The lower target shading angle Δθlt corresponds to a vertical length from the center M to a lower end of the first region R1, and can be calculated by multiplying the lower vehicle height angle Δθl by the lower margin coefficient Cl. Consequently, a lateral angle θrt corresponding to the right end of the first region R1 becomes θrt=(θr+θle)/2+Δθr×Cr, a lateral angle θlet corresponding to the left end of the first region R1 becomes θlet=(θr+θle)/2−Δθle×Cle, a vertical angle θut corresponding to the upper end of the first region R1 becomes θut=(θu+θl)/2+Δθu×Cu, and a vertical angle θlt corresponding to the lower end of the first region R1 becomes Δlt=(θu+θl)/2−Δθl×Cl.

Figure 5:
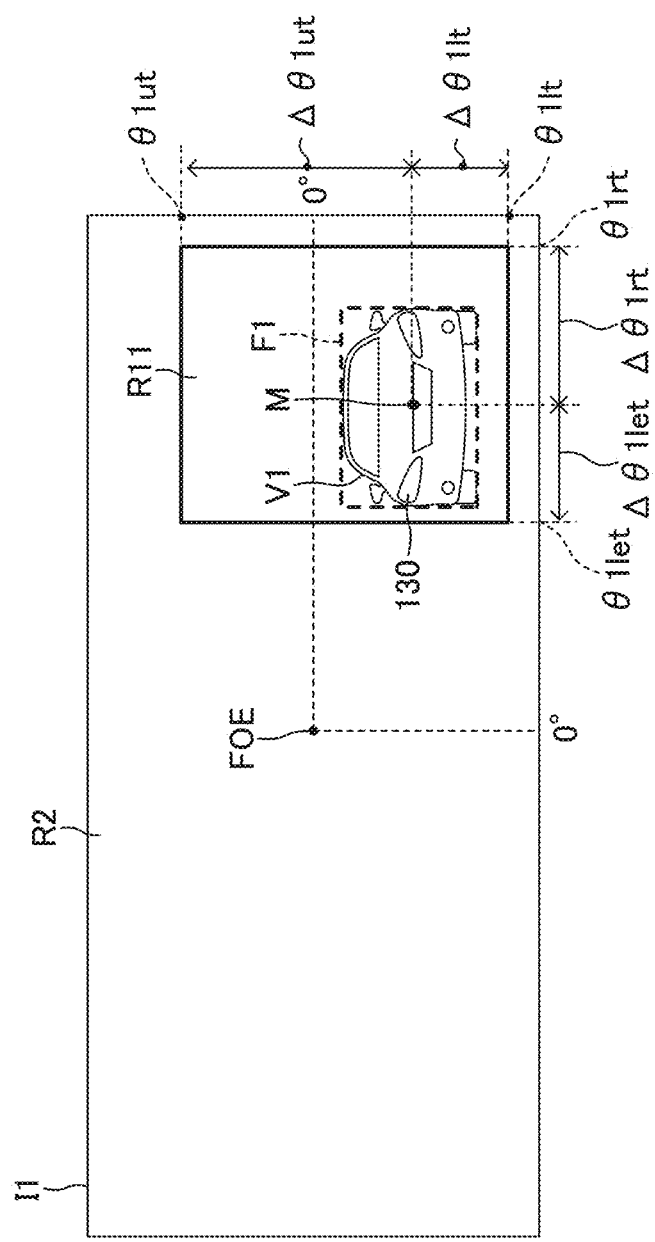
FIG. 5 is a diagram illustrating an area of a first region of the oncoming vehicle of FIG. 3.

FIG. 5 is a diagram illustrating an area of a first region R11 of the oncoming vehicle V1. A lateral angle θ1rt, a lateral angle θ1let, a vertical angle θ1ut, and a vertical angle θ1lt corresponding to right, left, upper, and lower ends of the first region R11 may be calculated as follows, respectively.

$$\theta 1rt = (\theta 1r + \theta 1le)/2 + \Delta\theta 1rt(\Delta\theta 1rt = \Delta\theta 1r \times C1r)$$

$$\theta 1let = (\theta 1r + \theta 1le)/2 - \Delta\theta 1let(\Delta\theta 1let = \Delta\theta 1le \times C1le)$$

$$\theta 1ut = (\theta 1u + \theta 1l)/2 + \Delta\theta 1ut(\Delta\theta 1ut = \Delta\theta 1u \times C1u)$$

$$\theta 1lt = (\theta 1u + \theta 1l)/2 - \Delta\theta 1lt(\Delta\theta 1lt = \Delta\theta 1l \times C1l)$$

The area of the first region R1 is defined by calculating the angles θrt, θlet, θut, and θlt. As is apparent from the above description, as at least one of the vehicle width angle ΔθL (=2Δθr=2Δθle) or the absolute value of the right vehicle angle θr increases, a right margin from the right end of the front vehicle to the right end of the first region R1 increases. Further, as at least one of the vehicle width angle ΔθL or the absolute value of the left vehicle angle θle increases, a left margin from the left end of the front vehicle to the left end of the first region R1 increases. Further, as at least one of the vehicle height angle ΔθV (=2Δθu=2Δθl) or the absolute value of the center vehicle angle θm (=(θr+θle)/2) increases, an upper margin from the upper end of the front vehicle to the upper end of the first region R1 and a lower margin from the lower end of the front vehicle to the lower end of the first region R1 increase.

Once the area of the first region R1 has been defined, the CPU proceeds to step 260 to select, among the LED matrix of each of the headlights 30, LEDs to be controlled to be turned off. That is, the LEDs corresponding to the first region R1 is subject to the turn off control. The LEDs to be controlled to be turned off may be selected by a well-known method using the angles θrt, θlet, θut, θlt, and the vehicle-state information.

Next, the CPU proceeds to step 270, and executes the AH control by controlling turning off of the LEDs selected in the step 260 and controlling turning on of other LEDs. As a result, the first region R1 is shaded (shielded from light), and only a second region R2 is selectively irradiated. After that, the CPU proceeds to step 295 and terminates the present routine.

As shown in FIG. 4, in the present embodiment, an increase rate of the right margin coefficient Cr associated with an increase in the right vehicle angle θr having a positive value is larger than an increase rate of the right margin coefficient Cr associated with a decrease in the right vehicle angle θr having a negative value. Therefore, when the absolute values of the right vehicle angles θr are equal, the right margin of the first region R1 is larger when the right end of the front vehicle is positioned on the right side with respect to the front-rear axis of the own vehicle than when the right end is positioned on the left side. Further, in the present embodiment, an increase rate of the left margin coefficient Cle associated with a decrease in the left vehicle angle θle having a negative value is larger than an increase rate of the left margin coefficient Cle associated with an increase of the left vehicle angle θle having a positive value. Therefore, when the absolute values of the left vehicle angles θle are equal, the left margin of the first region R1 is larger when the left end of the front vehicle is positioned on the left side with respect to the front-rear axis of the own vehicle than when the left end is positioned on the right side. On the other hand, when the center vehicle angles θm are equal, the upper margin coefficient Cu is larger than the lower margin coefficient Cl. In FIG. 4, a scale of a vertical axis of the graph Gr is different from a scale of a vertical axis of the graph Gle.

Figure 6:
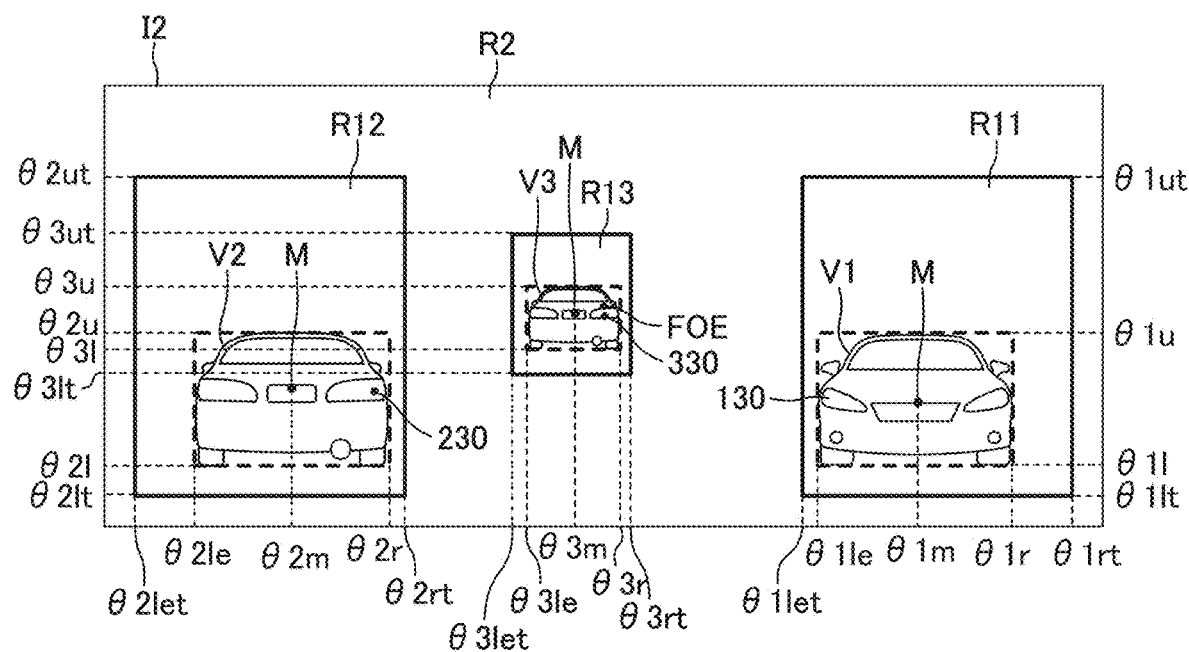
FIG. 6 is a diagram illustrating an area of a first region of each of a plurality of front vehicles in a captured image.

A detailed description will be given with reference to FIG. 6. FIG. 6 is a diagram illustrating a captured image I2 of when the headlights 130 of the oncoming vehicle V1 and the tail lamps 230 and 330 of preceding vehicles V2 and V3 are imaged by the camera sensor 20. For convenience of description, vehicle bodies of the vehicles V1, V2 and V3 are also illustrated in FIG. 6, but what are actually imaged are only the headlights 130 and the tail lamps 230 and 330. Note that illustration of dividing lines is omitted. Angles θ1r, θ1le, θ1m, θ1u, θ1l, θ1rt1, θ1let, θ1ut, θ1lt of the oncoming vehicle V1, angles θ2r, θ2le, θ2m, θ2u, θ2l, θ2rt, θ2let, θ2ut, θ2lt of the preceding vehicle V2, and angles θ3r, θ3le, θ3m, θ3u, θ3l, θ3rt, θ3let, θ3ut, θ3lt of the preceding vehicle V3 are calculated by the CPU executing the processing of steps 210 to 250 in FIG. 2.

In the example of FIG. 6, a right margin coefficient Cr2 corresponding to the right vehicle angle θ2r of the preceding vehicle V2 is larger than a right margin coefficient Cr3 corresponding to the right vehicle angle θ3r of the preceding vehicle V3. In addition, a right vehicle width angle Δθ2r of the preceding vehicle V2 is larger than a right vehicle width angle Δθ3r of the preceding vehicle V3. Therefore, a right target shading angle Δθ2rt of the preceding vehicle V2 is larger than a right target shading angle Δθ3rt of the preceding vehicle V3. That is, a right margin of a first region R12 of the preceding vehicle V2 is larger than a right margin of a first region R13 of the preceding vehicle V3.

In the example of FIG. 6, a vehicle width angle Δθ1L of the oncoming vehicle V1 is equal to a vehicle width angle Δθ2L of the preceding vehicle V2, but the oncoming vehicle V1 is located on the right side with respect to the front-rear axis of the own vehicle, while the preceding vehicle V2 is located on the left side with respect to the front-rear axis. Therefore, a right margin coefficient Cr1 of the oncoming vehicle V1 is significantly larger than a right margin coefficient Cr2 of the preceding vehicle V2. Accordingly, a right margin of the first region R11 is significantly larger than a right margin of the first region R12.

For similar reasons, a left margin of the first region R12 is significantly greater than a left margin of the first region R13 and a left margin of the first region R11.

On the other hand, an upper margin coefficient Cu2 corresponding to the center vehicle angle θ2m of the preceding vehicle V2 is slightly larger than an upper margin coefficient Cu3 corresponding to the center vehicle angle θ3m of the preceding vehicle V3. In addition, an upper vehicle height angle Δθ2u of the preceding vehicle V2 is larger than an upper vehicle height angle Δθ3u of the preceding vehicle V3. Therefore, an upper target shading angle Δθ2ut of the preceding vehicle V2 is larger than an upper target shading angle Δθ3ut of the preceding vehicle V3. That is, an upper margin of the first region R12 is larger than an upper margin of the first region R13.

In the example of FIG. 6, the upper margin coefficient Cu1 corresponding to the central vehicle angle θ1m of the oncoming vehicle V1 is equal to the upper margin coefficient Cu2 corresponding to the central vehicle angle θ2m of the preceding vehicle V2 (because θ1m=θ2m). In addition, the vehicle height angle Δθ1V of the oncoming vehicle V1 is equal to the vehicle height angle Δθ2V of the preceding vehicle V2. Therefore, an upper margin of the first region R11 is equal to an upper margin of the first region R12.

For similar reasons, a lower margin of the first region R12 is greater than a lower margin of the first region R13. A lower margin of the first region R11 is equal to a lower margin of the first region R12.

As described above, in the present embodiment apparatus, each of the right/left/upper/lower margins of the first region R becomes smaller as each of the absolute values of the right/left/center vehicle angles θr/θle/θm (that is, the absolute value of the lateral position of the front vehicle in the captured image I) becomes smaller. Therefore, the margins of the first region in a right-in-front region (directly front region) of the own vehicle become significantly smaller than the margins of the first region by the conventional AH control. On the other hand, in the present embodiment apparatus, each of the right/left/upper/lower margins of the first region R increases as each of the absolute values of the right/left/center vehicle angles θr/θle/θm increases. Therefore, the margins of the first region in a diagonally front region of the own vehicle are set to be wide to some extent. Generally, a region necessary for driving operation is the right-in-front region of the front region of the own vehicle. Therefore, according to a configuration of the present embodiment apparatus, in a region necessary for the driving operation, it is possible to ensure visibility to a far distance in a wider area without dazzling a passenger of the front vehicle. In addition, in a region that has little influence on the driving operation, it is possible to reliably reduce a possibility of dazzling the passenger of the front vehicle. Therefore, the area of the first region can be appropriately set.

In particular, when the oncoming lane is positioned on the right side with respect to the traveling lane, it is extremely unlikely that the own vehicle enters a region on the right side of the oncoming vehicle. Therefore, by setting the increase rate of the right margin coefficient Cr associated with the increase in the right vehicle angle θr having the positive value to be larger than the increase rate of the right margin coefficient Cr associated with the decrease in the right vehicle angle θr having the negative value in the above-mentioned case, the possibility of dazzling the passenger of the front vehicle can be more reliably reduced in a region that has little influence on the driving operation. Also, when the oncoming lane is positioned on the right side with respect to the traveling lane, it is extremely unlikely that the own vehicle enters a region on the left side of the preceding vehicle. Therefore, by setting the increase rate of the left margin coefficient Cle associated with the decrease in the left vehicle angle θle having the negative value to be larger than the increase rate of the left margin coefficient Cle associated with the increase in the left vehicle angle θle having the positive value in the above-mentioned case, the possibility of dazzling the passenger of the front vehicle can be more reliably reduced in a region that has little influence on the driving operation.

The light distribution control apparatuses according to the present embodiment has been described. However, the present invention is not limited to the aforementioned embodiment and may adopt various modifications within a scope of the present invention.

For example, when the oncoming lane is positioned on the left side with respect to the traveling lane, a behavior of the graph Gr of FIG. 4 may be reversed with respect to the vertical axis. Similarly, a behavior of the graph Gle of FIG. 4 may be reversed with respect to the vertical axis. In this case, an increase rate of the right margin of the first region R associated with a decrease in the right vehicle angle θr having a negative value is larger than an increase rate of the right margin associated with an increase in the right vehicle angle θr having a positive value. Further, an increase rate of the left margin of the first region R associated with an increase in the left vehicle angle θle having a positive value is larger than an increase rate of the left margin associated with a decrease in the left vehicle angle θle having a negative value. Also with this configuration, the same effects as those of the present embodiment apparatus can be obtained.

In addition, as described above, in the method of calculating the distance from the own vehicle to the front vehicle based on the size of the light of the front vehicle in a captured image, it is highly likely that the distance cannot be appropriately calculated. However, when a condition that the front vehicle is positioned directly in front of the own vehicle and the distance to the front vehicle is relatively short (e.g., 50 m or less) is satisfied, the distance to the front vehicle can be appropriately calculated even in the above-described method. Therefore, the light distribution control apparatus may be configured to execute the same control as the conventional AH control when the above-described condition is satisfied, and execute the AH control of the above-described embodiment only when the above-described condition is not satisfied.

Further, the light distribution control apparatus may include a radar sensor capable of detecting a front vehicle. When a position of the front vehicle detected by the camera sensor 20 is in good match with a position of the front vehicle detected by the radar sensor, the same control as the conventional AH control may be executed.

Further, the light distribution control apparatus may be configured to calculate only the lateral angles θrt and θlet corresponding to the right end and the left end of the first region R1, or may be configured to calculate only the vertical angles θut and θlt corresponding to the upper end and the lower end of the first region R1.

Furthermore, the camera sensor 20 may be installed in the own vehicle such that its optical axis passes through a position shifted from a center of the own vehicle in the vehicle width direction. In this case, an origin of each of the margin coefficient graphs corresponds to the center of the own vehicle in the vehicle width direction. In addition, the vehicle angle θ can be appropriately calculated from the lateral length and the vertical length from the FOE in the captured image I by considering an offset amount of the optical axis of the camera sensor 20 from the front-rear axis of the own vehicle.

Furthermore, the present invention is also applicable to a vehicle capable of executing automated driving control.

What is claimed is:
1. A light distribution control apparatus comprising:
an imaging device capable of capturing an image of a front vehicle existing in front of an own vehicle;
a headlight capable of irradiating a front region of the own vehicle; and
a control unit capable of executing light distribution control for controlling light distribution of the headlight so that a predetermined first region including the front vehicle and a predetermined second region other than the first region are irradiated with different illuminances based on the captured image obtained by capturing an image of the front region of the own vehicle,
wherein the control unit is configured to:
set an illuminance to be irradiated in the first region to be less than an illuminance to be irradiated in the second region;
set an area of the first region based on a position in a lateral direction of the front vehicle in the captured image;
when an angle in the lateral direction of a right end and a left end of the front vehicle with respect to a front-rear axis of the own vehicle is defined as a right vehicle angle and a left vehicle angle, respectively,
calculate the right vehicle angle and the left vehicle angle based on positions in the lateral direction of the right end and the left end of the front vehicle in the captured image, respectively, and to calculate a difference between the right vehicle angle and the left vehicle angle as a vehicle width angle of the front vehicle;
execute the light distribution control so that a right margin from the right end of the front vehicle to a right end of the first region increases as at least one of an absolute value of the right vehicle angle or the vehicle width angle increases, and
execute the light distribution control so that a left margin from the left end of the front vehicle to a left end of the first region increases as at least one of an absolute value of the left vehicle angle or the vehicle width angle increases.

2. The light distribution control apparatus according to claim 1, wherein,
when an angle in a vertical direction of an upper end and a lower end of the front vehicle with respect to the front-rear axis of the own vehicle is defined as an upper vehicle angle and a lower vehicle angle, respectively,
the control unit is configured to:
calculate the upper vehicle angle and the lower vehicle angle based on positions in the vertical direction of the upper end and the lower end of the front vehicle in the captured image, respectively, and to calculate a difference between the upper vehicle angle and the lower vehicle angle as a vehicle height angle of the front vehicle; and
execute the light distribution control so that an upper margin from the upper end of the front vehicle to an upper end of the first region and a lower margin from the lower end of the front vehicle to a lower end of the first region increase as at least one of an absolute value of a center vehicle angle, which is a center angle between the right vehicle angle and the left vehicle angle, or the vehicle height angle increases.

3. The light distribution control apparatus according to claim 2, wherein,
when an angle in the lateral direction on a right side with respect to the front-rear axis is defined as a positive value, and an angle in the lateral direction on a left side with respect to the front-rear axis is defined as a negative value, in a case when an oncoming lane on which an oncoming vehicle travels is located on the right side with respect to a traveling lane on which the own vehicle travels, an increase rate of the right margin associated with an increase in the right vehicle angle having a positive value is greater than an increase rate of the right margin associated with a decrease in the right vehicle angle having a negative value, and an increase rate of the left margin associated with a decrease in the left vehicle angle having a negative value is greater than an increase rate of the left margin associated with an increase in the left vehicle angle having a positive value, and in a case when the oncoming lane is located on the left side with respect to the traveling lane, an increase rate of the right margin associated with a decrease in the right vehicle angle having a negative value is greater than an increase rate of the right margin associated with an increase in the right vehicle angle having a positive value, and an increase rate of the left margin associated with an increase in the left vehicle angle having a positive value is greater than an increase rate of the left margin associated with a decrease in the left vehicle angle having a negative value.

4. The light distribution control apparatus according to claim 3, wherein, when an angle in the lateral direction on a right side with respect to the front-rear axis is defined as a positive value, and an angle in the lateral direction on a left side with respect to the front-rear axis is defined as a negative value, in a case when an oncoming lane on which an oncoming vehicle travels is located on the right side with respect to a traveling lane on which the own vehicle travels, an increase rate of the right margin associated with an increase in the right vehicle angle having a positive value is greater than an increase rate of the right margin associated with a decrease in the right vehicle angle having a negative value, and an increase rate of the left margin associated with a decrease in the left vehicle angle having a negative value is greater than an increase rate of the left margin associated with an increase in the left vehicle angle having a positive value, and in a case when the oncoming lane is located on the left side with respect to the traveling lane, an increase rate of the right margin associated with a decrease in the right vehicle angle having a negative value is greater than an increase rate of the right margin associated with an increase in the right vehicle angle having a positive value, and an increase rate of the left margin associated with an increase in the left vehicle angle having a positive value is greater than an increase rate of the left margin associated with a decrease in the left vehicle angle having a negative value.

5. The light distribution control apparatus according to claim 1, wherein, when an angle in the lateral direction of a right end and a left end of the front vehicle with respect to a front-rear axis of the own vehicle is defined as a right vehicle angle and a left vehicle angle, respectively, and an angle in a vertical direction of an upper end and a lower end of the front vehicle with respect to the front-rear axis is defined as an upper vehicle angle and a lower vehicle angle, respectively, the control unit is configured to:

calculate the right vehicle angle and the left vehicle angle based on positions in the lateral direction of the right end and the left end of the front vehicle in the captured image, respectively;

calculate the upper vehicle angle and the lower vehicle angle based on positions in the vertical direction of the upper end and the lower end of the front vehicle in the captured image, respectively, and calculate a difference between the upper vehicle angle and the lower vehicle angle as a vehicle height angle of the front vehicle; and execute the light distribution control so that an upper margin from the upper end of the front vehicle to an upper end of the first region and a lower margin from the lower end of the front vehicle to a lower end of the first region increase as at least one of an absolute value of a center vehicle angle, which is a center angle between the left vehicle angle and the right vehicle angle, or the vehicle height angle increases.

* * * * *